Jan. 25, 1938.  L. H. MORIN  2,106,185
VENDING MACHINE
Filed Sept. 8, 1934   14 Sheets-Sheet 1
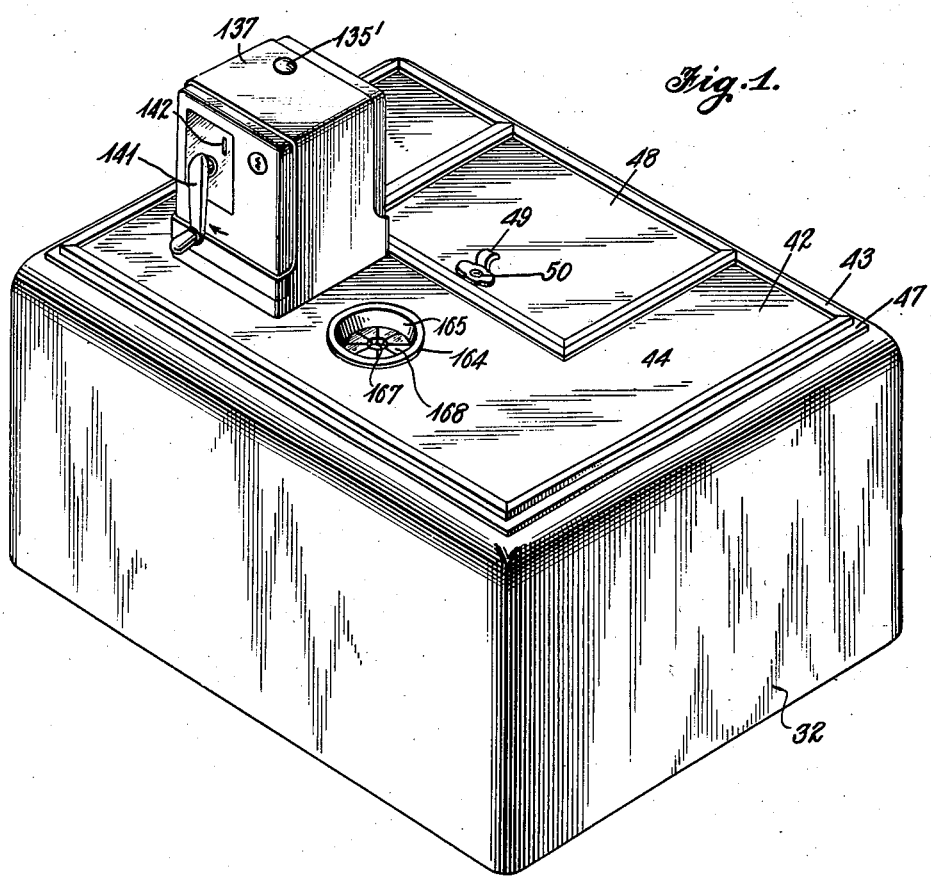
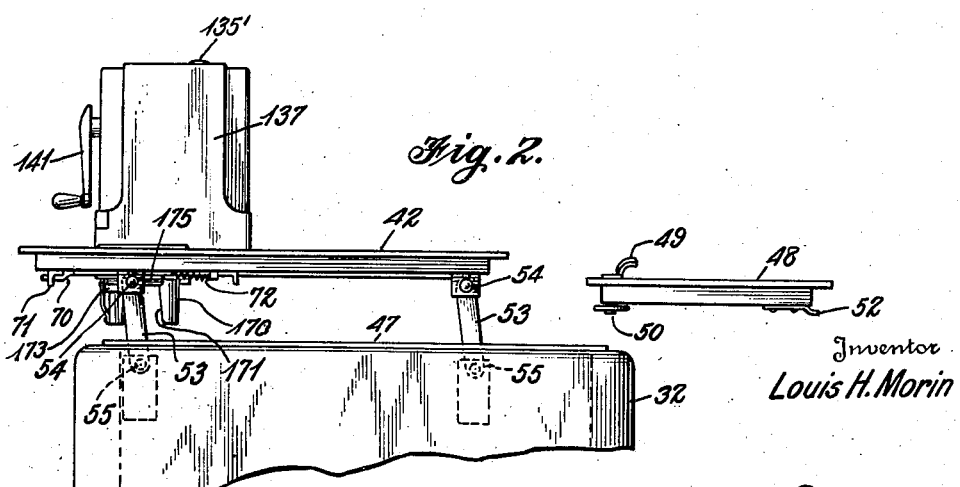
Inventor
Louis H. Morin
By Browne & Phelps
Attorneys

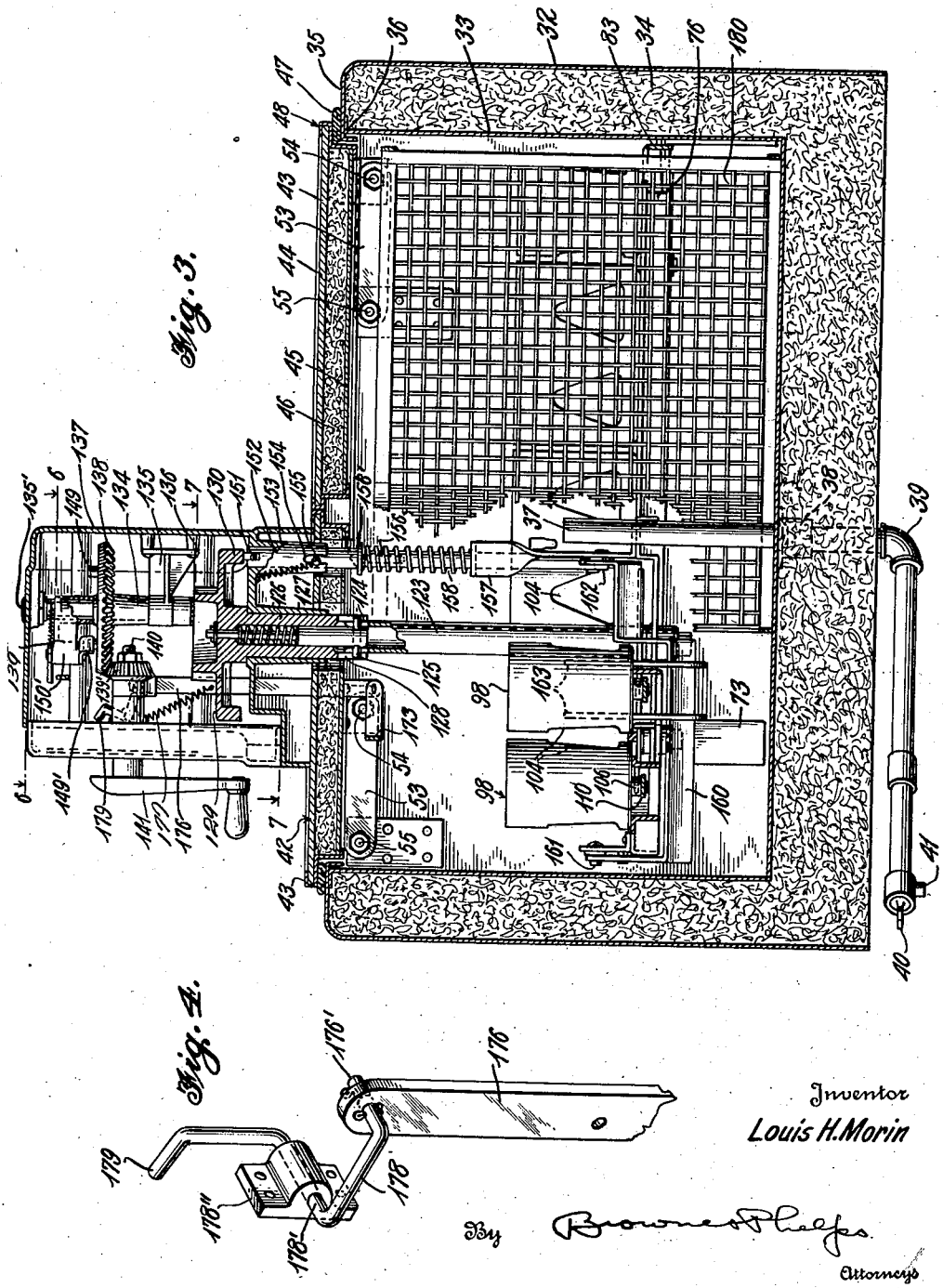

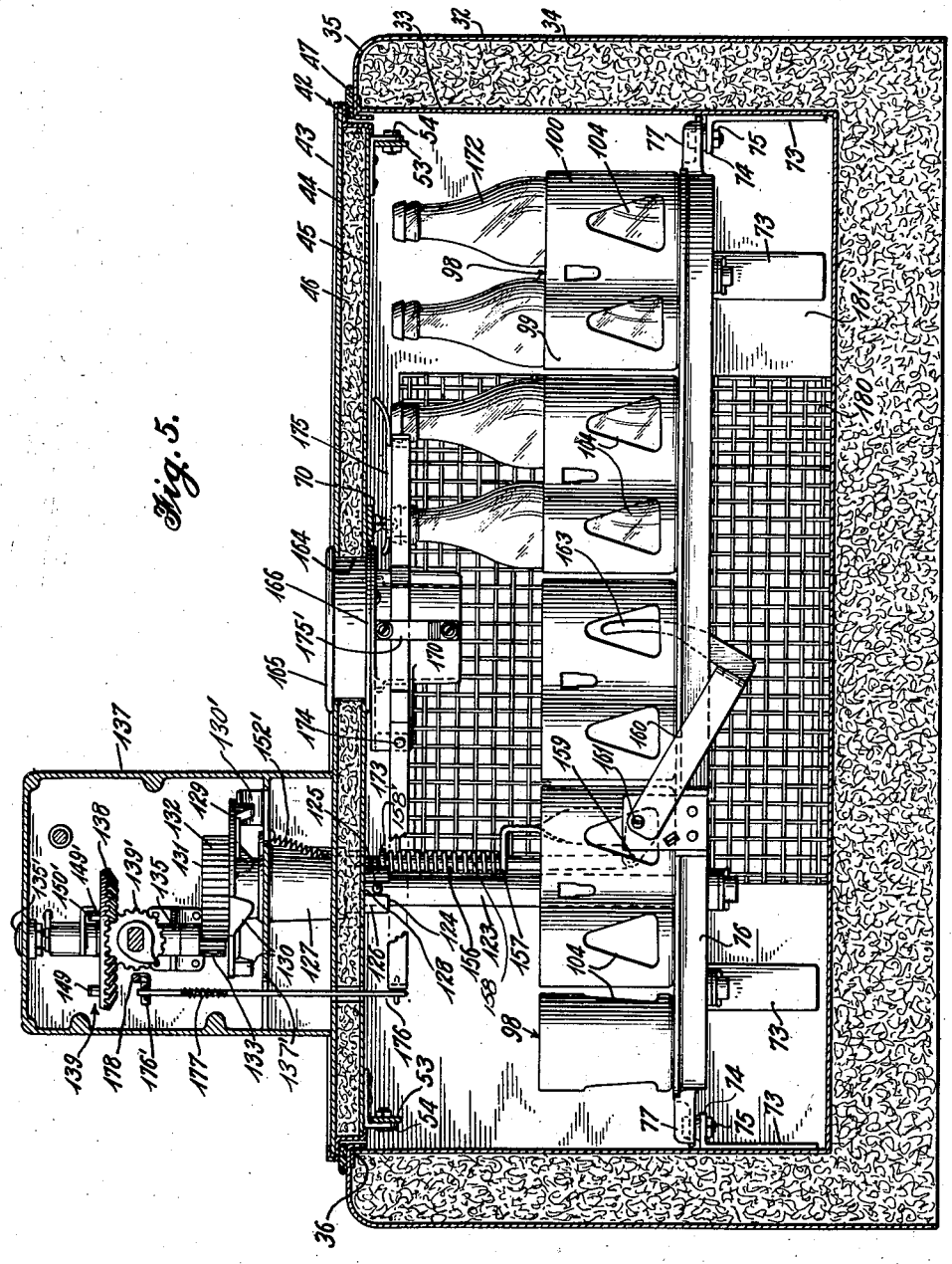

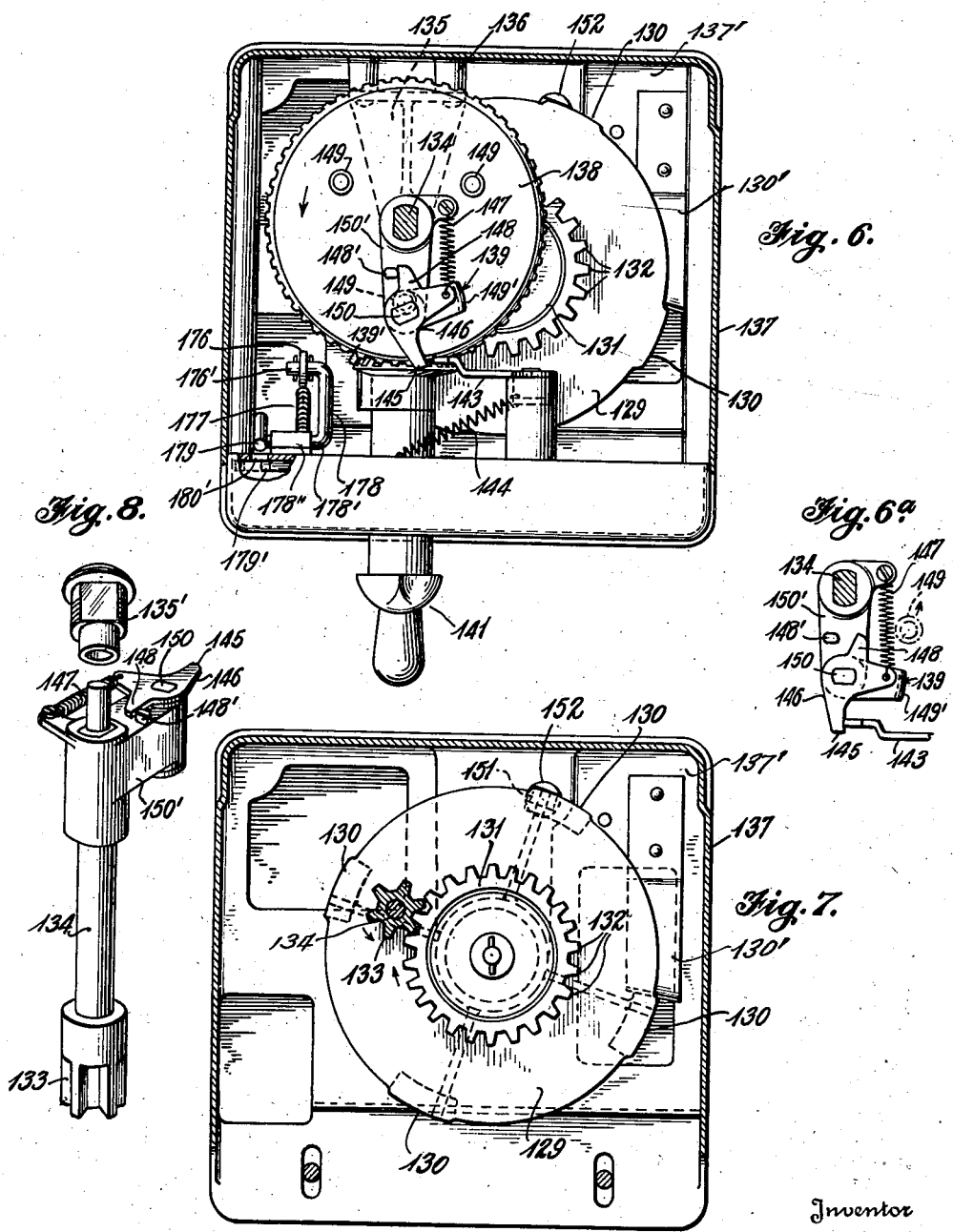

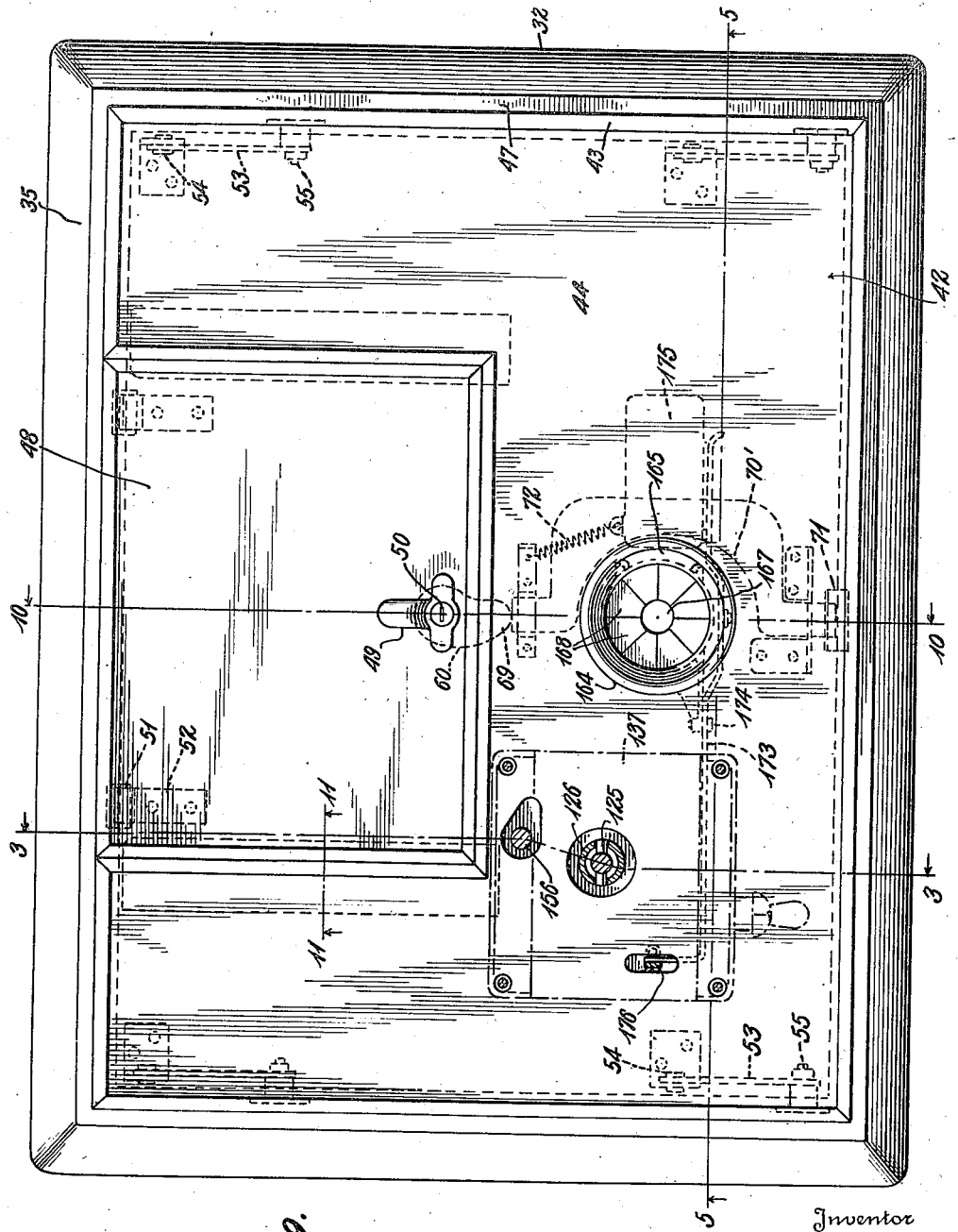

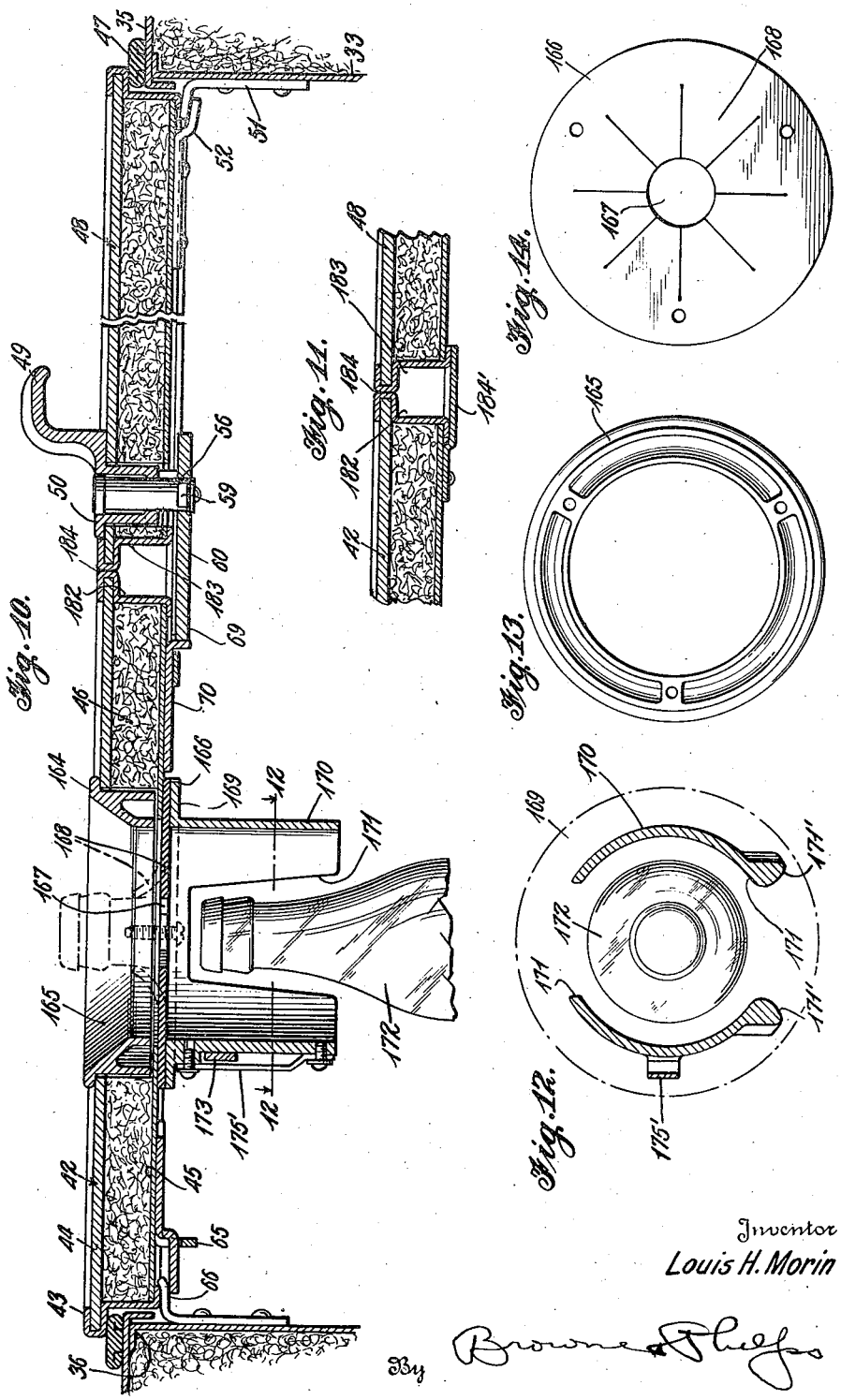

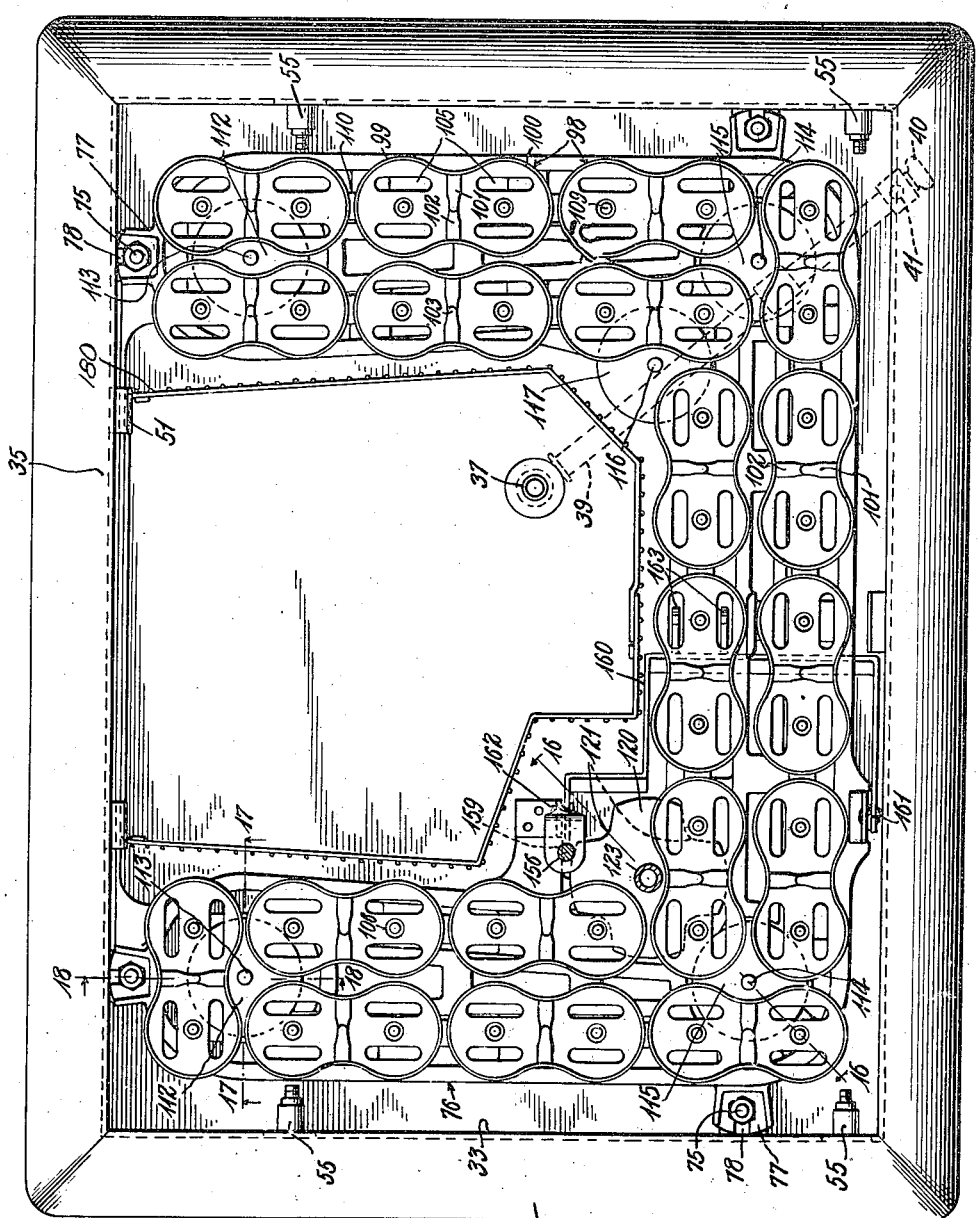

Jan. 25, 1938.   L. H. MORIN   2,106,185
VENDING MACHINE
Filed Sept. 8, 1934   14 Sheets-Sheet 8

Inventor
Louis H. Morin

By

Attorneys

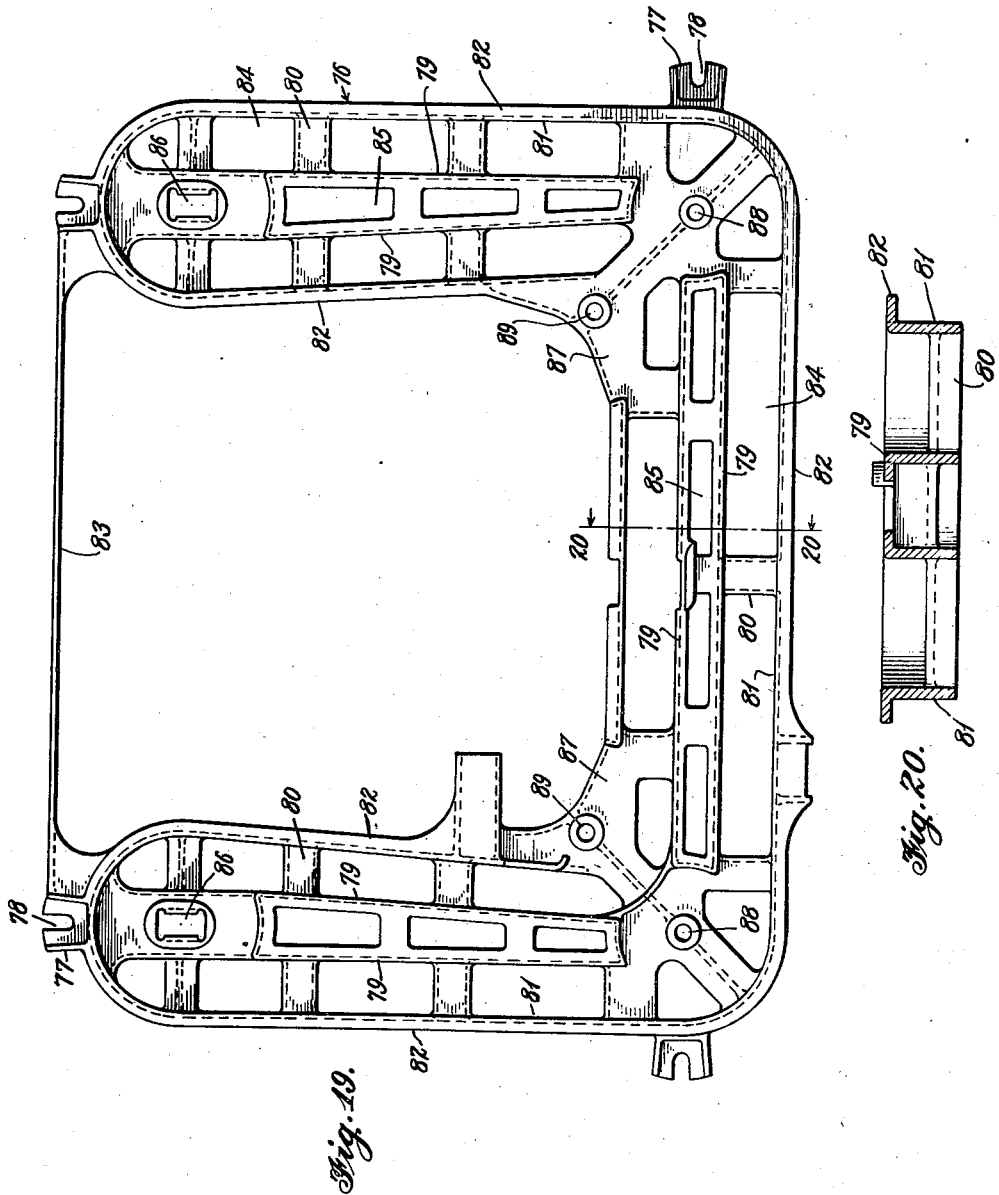

Jan. 25, 1938.　　　　　L. H. MORIN　　　　　2,106,185
VENDING MACHINE
Filed Sept. 8, 1934　　　　14 Sheets-Sheet 10
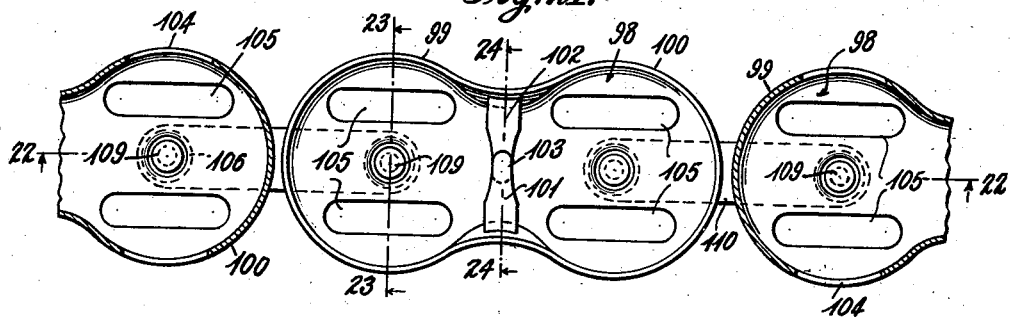
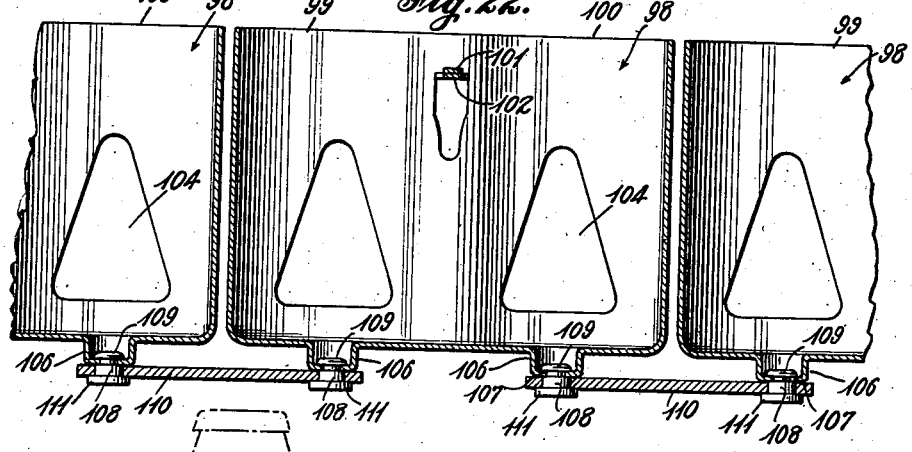
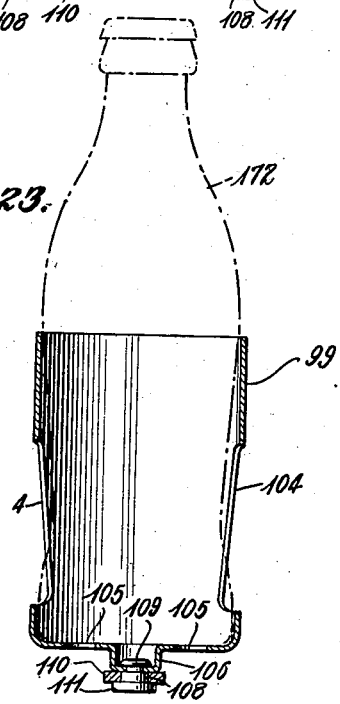
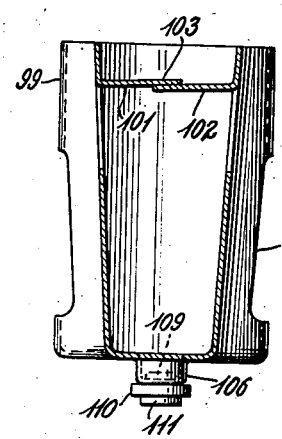
Inventor
Louis H. Morin
By Browne & Phelps
Attorneys

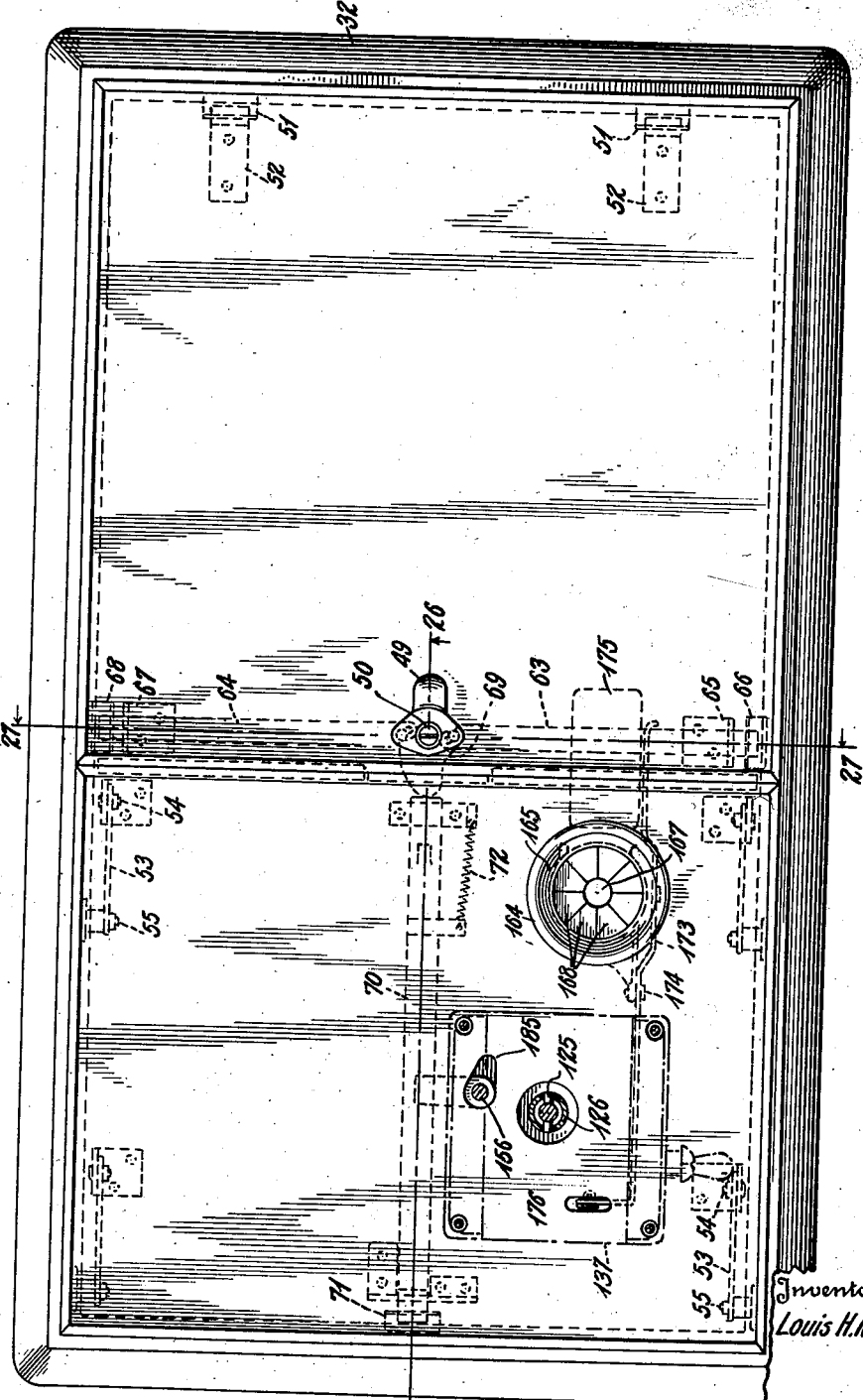

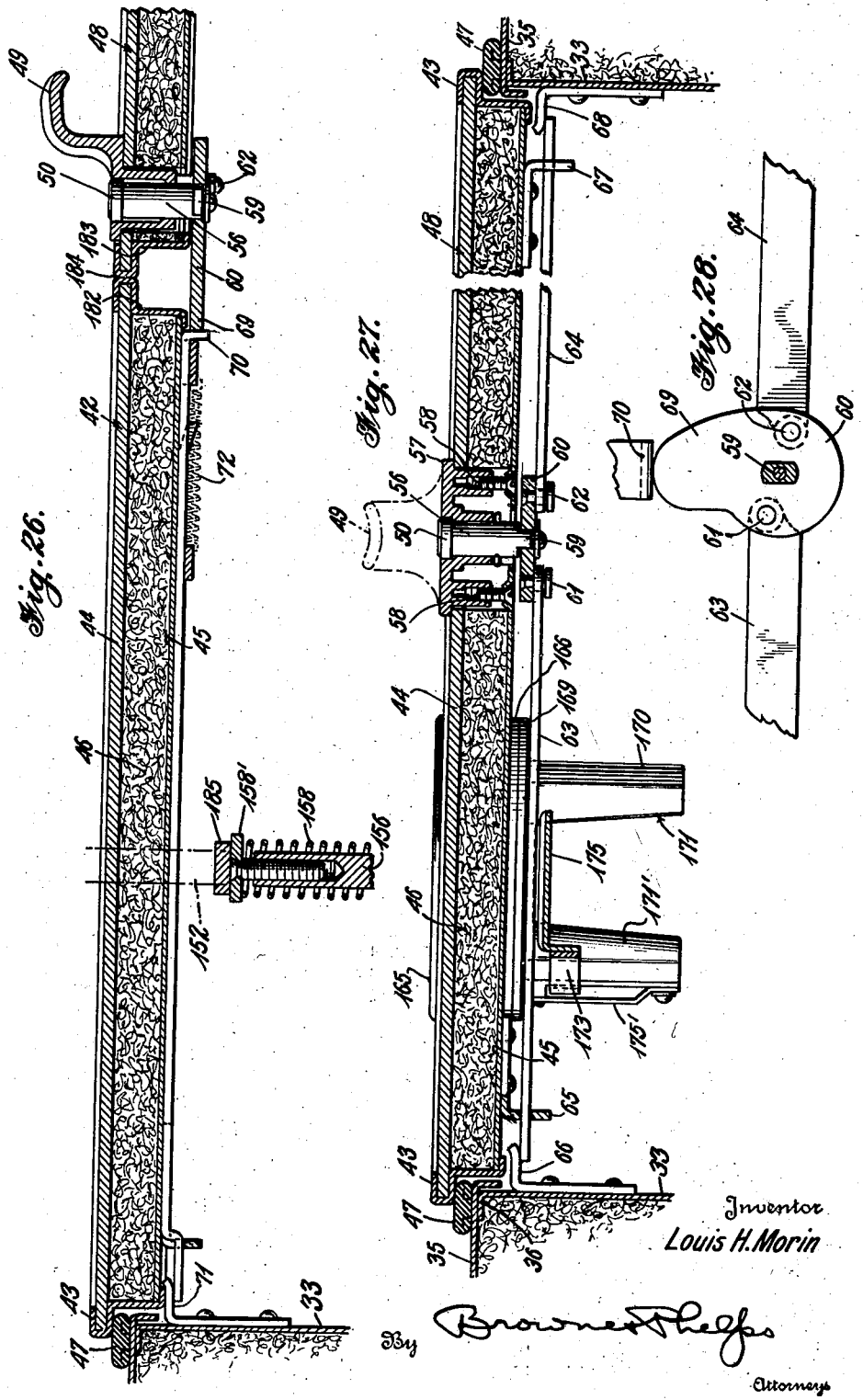

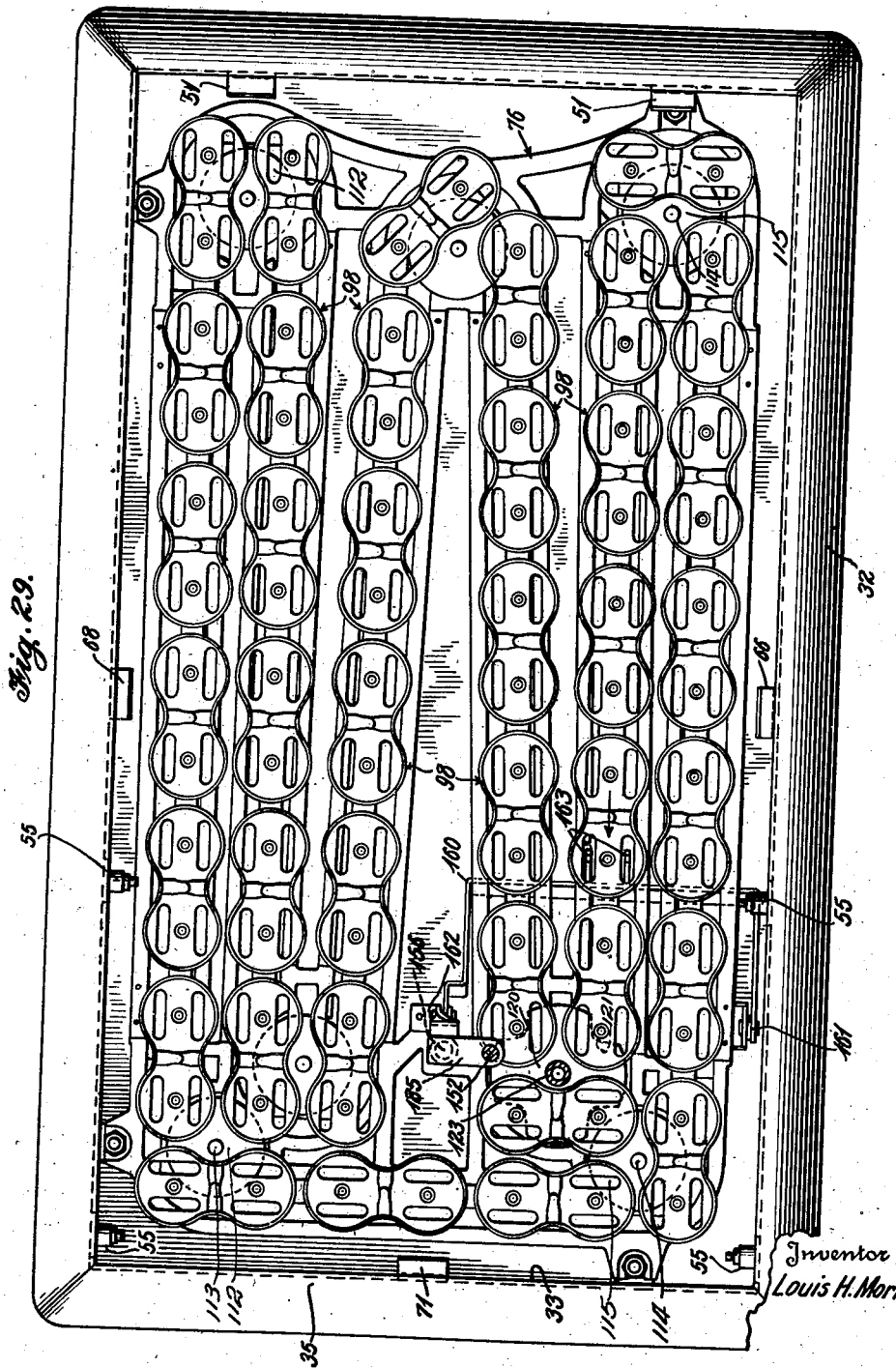

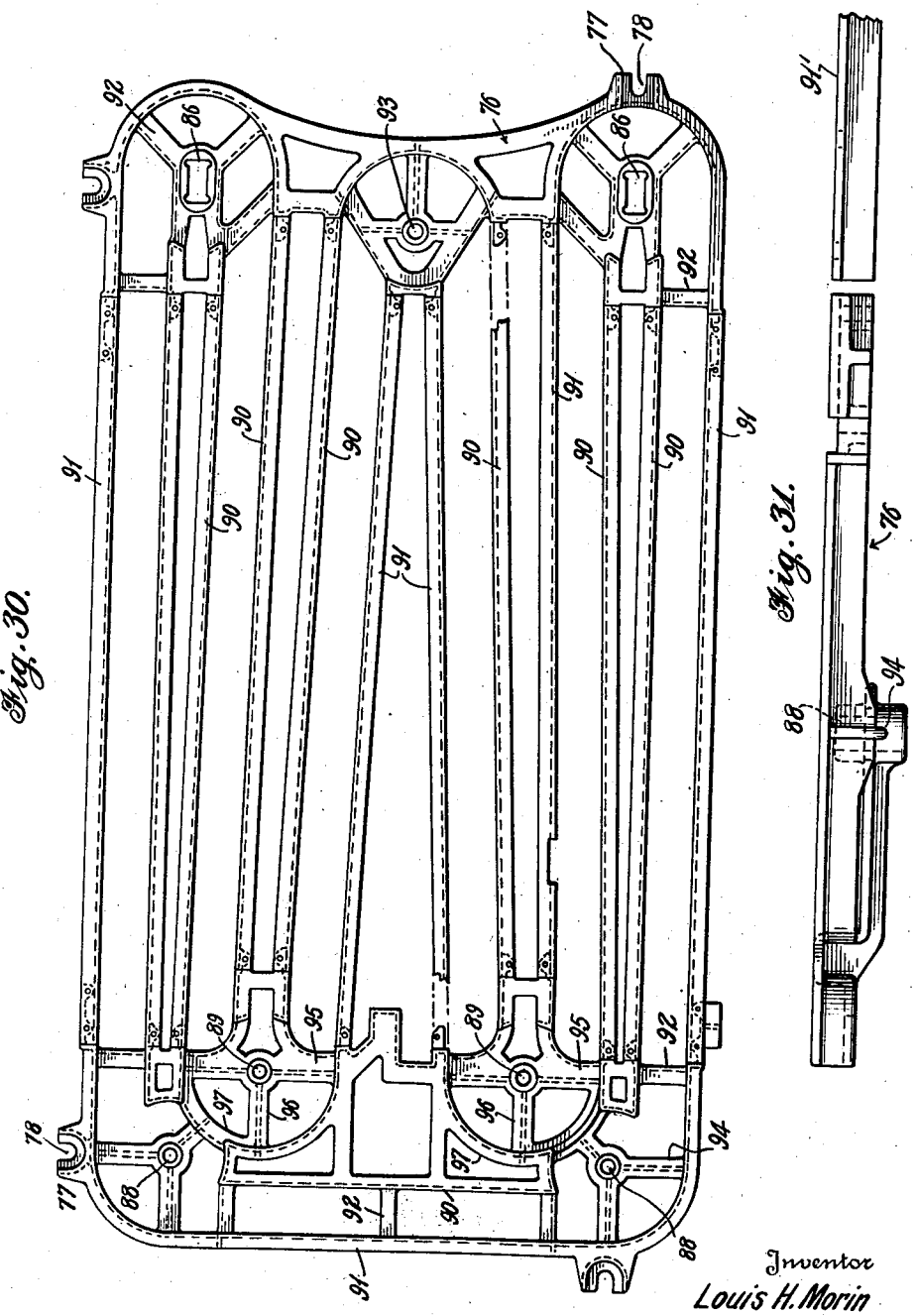

Patented Jan. 25, 1938

2,106,185

UNITED STATES PATENT OFFICE 2,106,185

VENDING MACHINE

Louis H. Morin, New York, N. Y., assignor to The Coca-Cola Company, Wilmington, Del., a corporation of Delaware Application September 8, 1934, Serial No. 743,255

10 Claims. (Cl. 312—36)

This invention relates to vending machines and more particularly to that class of such devices adapted for the sale of bottled beverages, means being included in connection with the vending apparatus for maintaining such bottled beverages at the desired temperature to enhance the potability thereof.

To this end the invention consists in the combination, sub-combinations and details of elements which advantageously coordinate a vending machine and a refrigerator or cooling device, operating either mechanically or through the medium of ice.

Referring to the accompanying drawings, forming a portion of this specification, and in which the same reference numerals are used to indicate the same parts throughout;

Figure 1 is a perspective view of the apparatus.

Figure 2 is a fragmentary elevation showing the cover or closure sections in open relation.

Figure 3 is a vertical sectional view on line 3—3 of Figure 9.

Figure 4 is a detail perspective of certain parts preventing deposit of a coin when the apparatus is empty.

Figure 5 is a vertical section at right angles to Figure 3 on line 5—5 of Figure 9.

Figure 6 is a horizontal section on line 6—6 of Figure 3, particularly showing a clutch or coupling mechanism to operate the machine under coin-control.

Figure 6a is a view substantially similar to Figure 6 but showing the clutch or coupling mechanism released as at the start of an operation.

Figure 7 is a horizontal section on line 7—7 of Figure 3 showing a driving mechanism.

Figure 8 is a detail perspective of the drive shaft and pinion with some of the parts in separated relation.

Figure 9 is a plan view of the apparatus with the coin-control and drive mechanism omitted.

Figure 10 is an enlarged sectional view on line 10—10 of Figure 9 showing the discharge, and "empty" control.

Figure 11 is an enlarged detail section on line 11—11 of Figure 9.

Figure 12 is a horizontal section on line 12—12 of Figure 10.

Figure 13 is a bottom plan view of the ring surrounding the discharge opening.

Figure 14 is a plan view of the wiper disk through which the bottles are partially discharged and then manually removed.

Figure 15 is a plan view of the interior of one form of the apparatus.

Figure 19 is a plan view of the chassis which supports the vending conveyor mechanism.

Figure 20 is a detail section on line 20—20 of Figure 19.

Figure 21 is a plan view of a portion of the conveyor and its bottle cups.

Figure 22 is a sectional view on line 22—22 of Figure 21.

Figure 23 is a sectional view on line 23—23 of Figure 21.

Figure 24 is a sectional view on line 24—24 of Figure 21.

Figure 25 is a top plan view similar to Figure 9 of another type of the apparatus.

Figure 26 is a sectional view on line 26—26 of Figure 25.

Figure 27 is a sectional view on line 27—27 of Figure 25.

Figure 28 is a detail plan view of the cover locking cam and associated parts.

Figure 29 is an interior plan view of the apparatus shown in Figure 25.

Figure 30 is a top plan view of the chassis which supports the vending conveyor mechanism in the type of apparatus shown in Figures 25 and 29, and, Figure 31 is an enlarged fragmentary elevation of the chassis shown in Figure 30.

Figure 16:
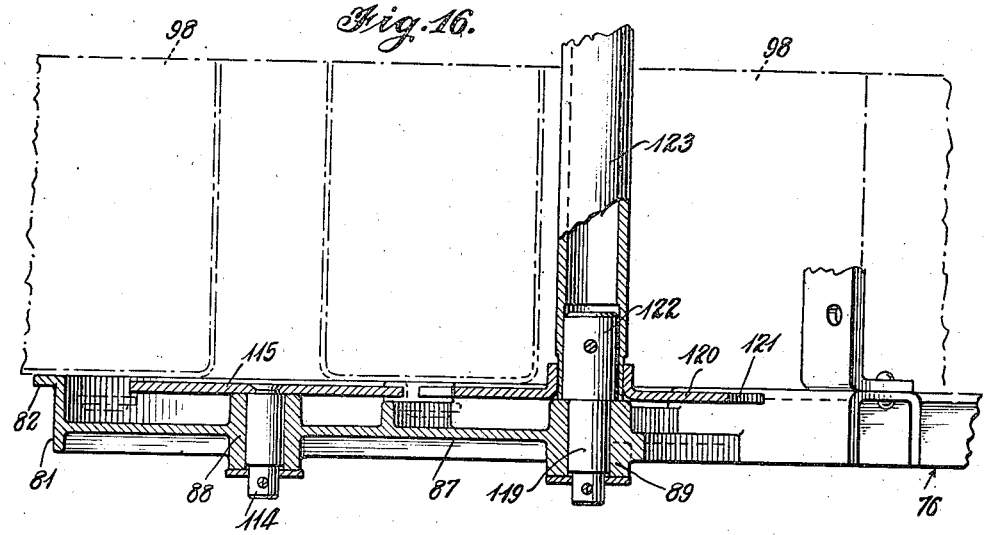
Figure 16 is a detail section on line 16—16 of Figure 15.
Figure 17:
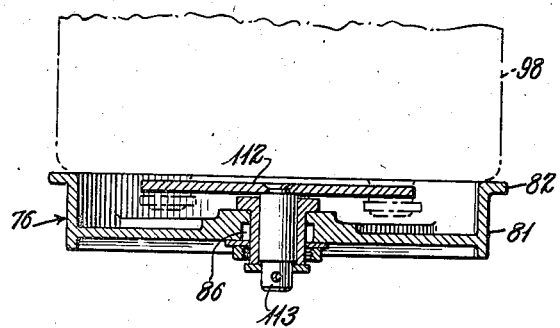
Figure 17 is a detail section on line 17—17 of Figure 15.
Figure 18:
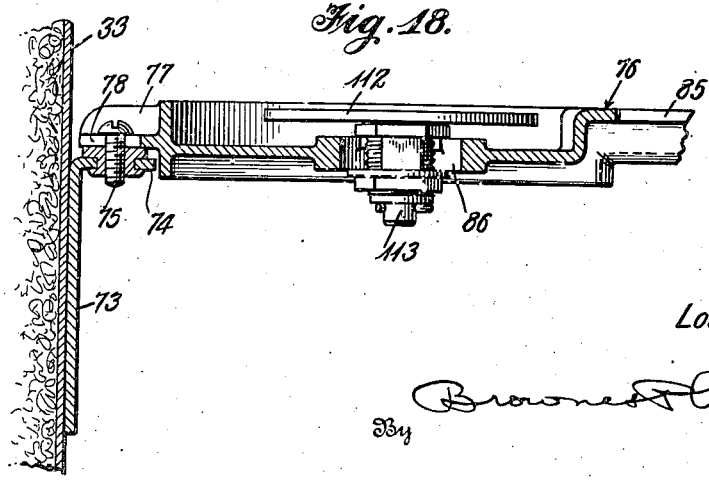
Figure 18 is a detail section on line 18—18 of Figure 15.

In both forms of the apparatus there is provided a suitable portable cabinet 32, adapted to be appropriately supported interiorly of which is a tank 33, and between which tank and the cabinet walls, suitable insulation 34 is provided. The tank 33 is open at the top and is secured to the inturned upper flange 35 of the cabinet 32 at 36 as shown, forming a properly insulated rectangular double wall structure.

The tank 33, as best shown in Figure 3, is provided with a drain pipe 37 communicating with a fitting 38 to which is connected suitable piping 39, the discharge from which is controlled by means of a petcock 40 at an outlet 41. Said tank is adapted to be filled with iced water and thus this drain construction controls the level of the cooling water within the tank.

In the construction illustrated in Figure 3, at the top of the closure or cover 42 on the edges thereof there is an inturned bead 43 which holds a covering sheet 44 of linoleum or other suitable material in place. Said cover 42 is double walled as sheet 44 is supplemented by a wall at 45 and suitable insulation 46 is disposed between these walls. Mounted on the inturned edge 35 is a rubber breaker strip or gasket 47 adapted to receive the extended edge 43 of the cover 42 and to form a seal therewith when the cover is in closed position. As Figures 1, 2 and 10 advantageously illustrate, there is an additional cover 48 affording access to the interior of the tank 33 for inspection and reicing, such cover 48 having a handle 49 and a lock 50, the operation of such lock being hereinafter described. As best shown in Figure 10, the inner wall of the tank 33 has a lug 51 thereon and on the under surface of the cover 48, there is a cooperating lug 52 adapted to hook under the lug 51 to prevent vertical movement of the rear edge of the cover 48, but permitting vertical movement of the front end of said cover and horizontal movement of the entire cover 48 after release of the lock 50.

The front cover 42 is mounted on four swingable links 53 connected by pivots 54 on the under side of said cover and by pivots 55 on the interior of the tank 33.

Said lock 50, as best shown in Figures 9, 10, 26 and 27 comprises a cylinder 56 rotatably mounted within a bearing plate 57 secured to the under portion of the cover 48 by means of screws 58. The cylinder 56 carries an extension 59 which in turn supports a plate 60 rotatable with the cylinder 56, such plate carrying pivots 61 and 62 upon which are mounted, respectively, the locking arms 63 and 64. The arm 63 is slidably mounted within a guide bracket 65 and is adapted in locked position to engage underneath a lug 66 on the interior of the tank 33. The arm 64 is similarly mounted to slide in a bracket or support 67 and engages the under side of a lug 68 on the interior of tank 33. Said plate 60 has a cam portion 69 which is adapted, upon rotation of the cylinder 56 to engage and disengage with a bar 70 (Figures 25 and 28) which extends forwardly under the main cover 42 where in locked position it engages a slotted plate or bracket 71 preventing vertical movement of the forward end of said cover. The bar 70 is normally retracted by a spring 72, such spring contracting when the cam 69 is withdrawn from engagement with the bar 70. Said bar 70 may be straight or as shown in Figure 9, where such bar, which is designated 70' is substantially U-shaped in order to clear a discharge opening for the bottles as vended and associated structure, but the operation of the locking means is the same as in Figures 25 and 28.

On the walls of the tank 33 (Figures 3 and 5) near the bottom thereof are four supports 73 having horizontal portions 74 adapted to removably support, by means of bolts 75, a chassis for the bottle conveying mechanism, such chassis being designated as a whole by the numeral 76 and being of two forms as shown in Figures 19 and 30. This chassis is in both constructions a skeleton metallic frame having four bolt-receiving lugs 77 provided with openings 78 cooperating with bolts 75 to removably secure the chassis to the supports 73.

In the construction of the chassis shown in Figure 19, it consists of a three sided framework preferably formed as a die casting with a central web 79 from both sides of which extend arms 80 which arms are in turn integral with an outer wall member 81 flanged as shown at 82. In order to strengthen the construction shown in Figure 19, a brace member 83 connects the two rearward extensions or sides of the chassis. Between the arms 80, are spaces 84, and the webs 79 have open spaces 85, both sets of spaces 84 and 85 being for the purpose of lightening the construction of the chassis without sacrificing the strength thereof.

At the rear of each of the rearwardly extending webs 79, there is provided a bearing slot 86 the purpose of which will be hereinafter disclosed. Between the rearwardly extending webs 79 and the front or cross web 79 there are solid portions 87 both of which are provided with bearings 88 and 89 for purposes hereinafter explained.

In the construction of chassis shown in Figure 30 there are six longitudinal members each designated by the numeral 90, said longitudinal members being connected to the outer member 91 by means of a plurality of arms 92. In this construction the slot bearings 86 are similarly located as in Figure 19, there being an additional bearing 93 provided at the rear of the chassis shown in Figure 30. The bearings 88 of the construction shown in Figure 30 are supported by webs 94 and in the case of bearings 89 formed in cross members 95, additional support is given by means of an arm 96 integral with an arc shaped web 97.

Both forms of chassis assure maximum strength and lightness, angle construction of the cross and longitudinal members being utilized wherever possible.

The mechanism for holding and covering the bottles to be vended is essentially a chain conveyor and consists of a plurality of receptacles 98, each one of which comprises bottle holding cups 99 and 100, formed of a single stamping from the sides of which and centrally of the receptacle are struck inturned tongues 101, 102 which may be spot welded together as shown at 103 in order to provide the necessary rigidity as shown in Figures 21, 22 and 24. The vertical sides of the bottle holding cups are cut-away as at 104, in order to enable free circulation of the cooling water through the bottle cups and also to reduce the resistance of the cooling water against the travel of the conveyor through such cooling water. The bottom of each one of the individual cups 99 and 100 has a pair of longitudinal slots 105 therein for a purpose hereinafter explained.

During the stamping operation, a stud 106 is formed on the bottom of each individual bottle cup, such stud being central or located midway between the longitudinal slots 105 and having a central opening 107 therein in which is rotatably mounted a pivot member 108, headed at 109 to prevent the same from dropping through the opening 107, and carrying a link 110 freely movable about the pivot 108 and held upon such pivot 108 by a second head 111 formed thereon. These links 110 join the studs 106 of adjacent individual cups and form with the cup receptacles, an endless conveyor chain which is mounted to travel over the chassis just described through mechanism hereinafter set forth.

In using the chassis 76 as best illustrated in Figure 15, there are disks 112 rotatably mounted on axles 113, such axles being adjustably held in place in the bearings 86. In the bearings 88, through the medium of axles 114, are similar disks 115 also rotatably mounted and in one of the bearings 89 by means of an axle 116 there is a similar disk 117. In the other bearing 89, there is a rotatable stub shaft 119 carrying a fixed driving gear 120 provided with four peripheral notches 121. The conveyor chain with its component bottle cups or carriers is placed upon the chassis as shown in Figure 15 to form a double stretch of endless conveyor which passes at right angles around the disks 112 and 114 with the outer periphery of such disks lying between and engaging with the studs 106 carried by the individual cups 99 and 100 of the bottle receptacles 98. In the position shown in Figure 15 it will be seen that three of the notches 121 of the driving gear 120 are engaged in driving relation with the studs 106 of the forward bottle receptacle 98 and with one of the studs 106 of the rearward bottle receptacle.

The stub shaft 119 has an upper enlarged portion 122 secured to a vertical hollow shaft 123, which is releasably or detachably keyed at its upper end by means of a key 125 to a second shaft 126 rotatably mounted in a bearing 127. The key 125 engages a slot 128 in the shaft 126 in normal operating position, and permits relative vertical movement of the shafts 123 and 126 while still coupled for rotation, as set forth later.

The chassis shown in Figures 29 and 30 is so arranged as to permit a six stretch conveyor. In this construction discs 112 are mounted in the bearings 86, 86, and 93 and discs 115 are mounted in the bearing 88. The bearing 89 carries a disc similar to the disc 117 and the shaft 119 is journalled in the bearing 89 in the same manner. This construction is utilized when the entire device is to be cooled by a mechanical unit as it affords greater capacity for the bottles to be vended.

As best shown in Figure 5, the said shaft 126 has integrally formed therewith an annular plate or disc member 129 depending from which are a series of cams 130. Mounted upon said member 129 is a gear 131 having external teeth 132 which in turn mesh with a gear 133 carried by a shaft 134 mounted in a suitable bracket 135 attached by supports 136 to the interior wall of a dome or housing 137 and in an adjustable bearing 135' supported also by said housing 137. Said shaft 134 carries a bevel gear 138 which is normally adapted to rotate freely about or loose on such shaft 134, but which can be, through the medium of a clutch mechanism 139, made to drive the shaft 134. The said gear 138 meshes with a bevel gear 139' mounted upon and rotatable with a shaft 140 which extends through to the front of the casing 137 where such shaft 140 is provided with an operating handle 141. A spring detent 130' cooperates with the cams 130, being fastened to a bracket 137' which is rigid with the housing 137.

The front of the casing 137 is provided with a coin slot 142 adapted for the insertion of a coin of the proper denomination for the price of the article to be vended. Insertion of a coin in such slot 142 followed by manual turning of the handle 141 in a clockwise direction, operates conventional coin-controlled mechanism which forms no portion of the present invention except as described hereinafter. For example, such coin-controlled mechanism may be that disclosed in Letters Patent No. 2,015,351, issued to me on September 24, 1935. The operation just described causes the coin-controlled mechanism to function and a continuous movement of the handle 141 moves or causes a detent member 143 to swing against the tension of a spring 144 to release contact with and move out of the path of an extension 145 of a pawl 146 to trip the pawl against the tension of a spring 147.

Said pawl 146 serves as a coupling or clutch means to control operation of the machine by the handle 141. Such pawl 146 is pivotally mounted by a shaft 150 to the free end of a bracket member 150' which is fixed to shaft 134. Secured to the lower end of said shaft 150 is an abutment 149' which in operative position is engaged by one of a series of studs 149 carried on the upper face of the bevel gear 138, when detent 143 has disengaged pawl 146.

An extension 148 is provided on pawl 146 and engages a stop 148' on bracket member 150' to ensure engagement of abutment 149' and one of the studs 149 through arcuate alinement.

When the various parts are in their operative positions as shown in Figure 6, shaft 140 and gear 139 are rotated by means of handle 141 and in turn rotate gear 138. One of the studs 149 engages the abutment 149', and rotates the entire clutch mechanism, through the medium of bracket 150', thereby rotating shaft 134 and shaft 126 through gears 131 and 133. When the coin mechanism is at rest or in inoperative position, the member 143 contacts extension 145 of pawl 146 and holds abutment 149' out of the circle of the studs 149 against the action of spring 147, so that if handle 141 is turned, gear 138 will rotate idly on shaft 134. Upon completion of one complete revolution of gear 138, cam 145 again engages member 143 which has returned by operation of the coin-controlled mechanism to its original position and holds the clutch mechanism in idling position.

The aforesaid cams 130 are timed to engage an antifriction roller 151 carried by a shaft 152 slidably mounted within a bearing 153 and having a vertical slot 154 at its lower end detachably engaging a transverse pin 155 mounted on a stub shaft 156 normally held in extreme vertical position in a bearing 157 by means of a coil spring 158 compressed between the bearing 157 and an annular member 158' carried by the shaft 156.

Said shaft 156 is pivotally connected at 159 (Figure 5) to a bottle-ejecting yoke 160 pivotally mounted at 161 and 162, such yoke carrying a pair of fingers 163 located so that during the latter part of their upward travel they are directly in line with the slots 105 in the bottom of either cup 99 or 100 as the case may be.

Directly above the bottle to be vended by the apparatus, the cover 42 has a discharge opening 164 protected by an annular metal casing or ring 165 which carries a disc 166 of sheet rubber or other suitable materials, having a small central opening 167 around which the disc 166 is slit radially to form V-shaped segments which taper toward the opening 167. Below the ring 165 is a guard member designated as a whole by the numeral 169 and comprising a depending annular skirt 170 provided with a pair of slots or openings 171 in line with the transverse path of travel of the bottles 172 on the front stretch of the conveyor as they travel toward the discharge opening. The purpose of this member 169 is to prevent the unauthorized removal of a bottle through the discharge opening by insertion of the fingers through such discharge opening prior to the discharging operation of the bottle as shown in dotted lines in Figure 10.

The slot or opening 171 forming the entrance for bottles 172 has its walls thickened and beveled to form guiding members 171', as shown in Figure 12, the purpose of these being to properly align any bottles which may for any reason have become tilted out of truly vertical position in the conveyor cups.

To prevent deposit of a coin when there are no bottles contained within the machine, means are provided as follows: A bar 173 extends parallel with the front line of bottles nearest the point of discharge and is pivotally mounted on a horizontal axis to guard 170 as at 174, extending between said guard and a guide 175' carried by said guard and is provided adjacent the discharge opening 164, with a horizontally disposed leaf 175 of a length to engage the tops of at least two of the oncoming bottles which maintains the bar 173 normally horizontal. In the absence of a bottle beneath leaf 175, the right hand end of bar 173 lowers (Figure 5) and the left hand end of such bar 173 rises, also raising a bar 176, due to the contraction of a spring 177, attached to bar 176 and casing 137, member 176 carrying a link 178. Bar 176 is pivotally connected at 176' to a link 178, journaled at 178' in a bracket 178" on casing 137 as shown in Figure 6, thus enabling a terminal 179 of said link, when the machine is empty, to enter an opening 180' in the coin-controlled mechanism and intercept movement of a horizontally movable slide 179' to the left in Figure 6, which movement is essential to enable slide 179' to uncover the coin deposit slot 142, the specific construction of such coin-controlled mechanism otherwise forming no part of the present invention. Thus the raising and lowering of bar 176, respectively rocks link 178 into and out of opening 180' and the path of return movement of slide 179'. Broadly expressed, bar 173 lowers at its right hand end (Figure 5) when the machine is empty as there are no bottles beneath leaf 175 to keep it raised and terminal 179 enters opening 180' and intercepts return of the slide 179', and hence prevents uncovering of coin slot 142 by that slide.

The smaller chassis 74 (Figures 15 and 19) is adapted in use primarily when the refrigerator is cooled with cracked ice and for this purpose a wire basket 180 is provided. In the larger construction embodying the chassis shown in Figures 29 and 30, the apparatus is adapted for cooling by means of a mechanical refrigeration unit of any approved type and in this construction the cooling coils of such unit (not shown) are located in the space 181 (Figure 5) between the chassis and the bottom of the tank 33.

When the apparatus is used with a mechanical refrigeration unit, the cover construction shown in Figures 25 and 26 is used. This cover comprises two cooperating lids 42 and 48 having their meeting edges undercut as shown at 182 and 183, so that the meeting edge 184 may be of smaller area to insure rapid and perfect fitting. The meeting edges of the two covers for the other form of the apparatus are similarly undercut for the same purpose as shown in Figure 10. The forward lid in Figure 25 is mounted in the same way and performs the same function as that shown in Figures 2 and 9, while the rearward cover shown in Figure 25 is so mounted and locked and performs the same function as the auxiliary cover shown in Figure 9, certain structural modifications having been made in order to adapt the locks to both forms of cover.

Where the larger capacity conveyor is used as shown in Figure 29, there may be a slight horizontal displacement of the position of shaft 156 of the ejector means disposing it out of vertical alinement with shaft 152. In order to take care of this, a lateral extension 185 is placed on shaft 156, with which said shaft 152 co-acts.

The operation of the device is as follows:

In the absence of a coin in the slot 142, the handle 141 may be revolved freely without operating the vending mechanism, as turning of the handle 141 will rotate shaft 140 and the gear 139 carried thereby and consequently the bevel gear 138 only. Said bevel gear 138 moves freely about the shaft 134 because the abutment 149' is out of the path of movement of the studs 149 and consequently no clutching action takes place.

Upon the insertion of a coin in slot 142 and a subsequent rotation of handle 141, the coin-controlled mechanism operates and releases or retracts detent member 143 from contact with pawl element 145, whereupon spring 147 moves the clutch pawl 146 toward shaft 134 thereby placing abutment 149' in the same circle with the studs 149 on gear 138. Continued rotation of the handle 141 causes the adjacent stud 149 to engage said abutment 149' which couples gear 138 to shaft 134 through bracket 150'. As shaft 134 revolves it drives through the medium of gear 133, the gear 131 enmeshed therewith which carries with it the disk 129 imparting rotation also to shafts 126 and 123 which in turn rotate the driving gear 120 which engages the studs 106 on the bottom of the conveyor cups. This rotation of driving gear 120 imparts motion of the entire conveyor, the bottoms of the cups 99 and 100 riding upon the rails formed by members 76' and 79 and 90 and 91' of the two forms of chassis.

Upon the start of an operation there is no bottle in line with discharge opening 164 and the adjacent bottle cannot be reached by the fingers because of guard 170.

As the conveyor brings a cup containing a bottle to be vended close to the discharge opening 164, one of the cams 130 engages the roller 151 on shaft 152 to impart a downward motion against the tension of spring 152' to the latter shaft which in turn is transmitted to shaft 156, which by means of its pivoted connection 159 with the yoke 160, causes such yoke to rock on its axis 161 and impart vertical movement to the discharge fingers 163, which by this time are aligned with the slots 105 in the bottom of the bottle-containing cup now directly beneath the discharge opening 164.

Continued rotation of the handle 141 causes the fingers 163 to rise through slots 105 into the cup, lifting and supporting the bottle in such cup partly ejected in the discharge opening 164 as shown in dotted lines in Figure 10. During such upward movement of the bottle 172, it passes through disk 166 and pushes apart the segments 168 so that the bottle may then be removed by hand, the bottle being wiped by the said segments.

The parts just referred to for the discharge operation remain in this position until the next vending operation is started when the engaging cam 130 disengages the shaft 158 for operating the discharge mechanism and the parts return to normal position to repeat the operation just described.

The bottles 172 maintain bar 173 level and upon the exhaustion of the bottles from the apparatus, the right hand end of bar 173 will lower due to the contraction of spring 177, resulting in the raising of bar 176 and rocking of link 178 so that its terminal 179 enters opening 180' and intercepts the return of slide 179', thus preventing such slide from uncovering the coin slot 142, until the machine has been refilled with bottles.

The purpose of the adjustable bearings 86 is to permit horizontal movement of such bearings in order to tighten or slacken the chain conveyor.

The locking means provided for securing both the main and auxiliary covers in place operates, in both constructions, two transverse locks for the front of the rear door and one forward lock for the front of the forward door. The transverse locking arrangement for the rear door is effected by means of the bars 63 and 64 which are extended or retracted when the locking cylinder 56 is turned by means of a key. The lock for the forward door is operated by the cam 59 which moves when the lock is operated by a key to engage the rearward end of bar 70 to force it forward into engagement with the keeper 71 against the operation of spring 72, which normally tends to keep the bar 70 in retracted position. An additional safeguard is the plate 184' secured to cover 42 and extending across and beneath the meeting edge 184 of the cover 42 and the cover 48 where plate 184' engages the under portion of the cover 48.

Refilling of the machine with bottles to be vended and the re-icing of the machine are facilitated by the displaceable closure or cover sections 42 and 48 as suggested by the showing in Figure 2. The provision of means by which the shafts 126 and 123 are releasably coupled together permits the front cover 42 to be swung upwardly on its supporting links, as shown in Figure 2, and after the re-filling and re-icing to be again lowered into closed position, whereupon the uncoupled members of the driving mechanism will again be coupled to place the device in position for operation.

The entire device has been constructed to conserve as completely as possible the cooling action. To this end the entire device is insulated between double walls, the closures are designed to fit as well as possible and the discharge opening has been closed by means of the segments 168 which perform the double function of wiping the moisture from the bottle upon withdrawal and also forming as complete a closure for the discharge opening as will permit ready withdrawal of such bottle.

Various changes may be resorted to within the spirit and scope of the invention as defined by the following claims.

I claim as my invention:

1. A device of the class described having a tank provided with a discharge opening in the top wall thereof, horizontally disposed endless conveyor means in the tank operable to advance bottles or the like in an up-standing position below and in alignment with said opening, manually operable means for the first mentioned means, a device for partially ejecting a bottle aligned with said opening and supporting such bottle in partially ejected position, said device being normally interfitted with said conveyor means, and mechanism operable through each operating movement of said manually operable means to disengage said device from the conveyor means and thereafter to restore said interengagement.

2. A device of the character described having a tank provided with a discharge opening, a conveyor in the tank to advance bottles or the like to said opening, an operating means for the conveyor, a device for partially ejecting a bottle aligned with said opening and supporting such bottle in partially ejected position, said device being normally interfitted with said conveyor, and mechanism operable through each operation of said operating means to disengage said device from the conveyor and thereafter to restore said interengagement.

3. A device of the class described including a tank having an opening in the wall thereof for removal of a bottle or the like, means within the tank to move bottles or the like to said opening, an up-standing operating shaft for said means, a closure for said tank, links connected to said closure and pivoted to the tank on the interior thereof below the top of the tank, said links maintaining the closure substantially horizontal in all positions and being movable from closure-closing position past the vertical and into contact with the tank to support the closure in open position, and operating means carried by said closure slidably connected to said shaft to permit the opening of the closure.

4. A device of the class described having a tank provided with a discharge opening in the top wall thereof, conveyor means in the tank operable to advance bottles or the like to said opening, operating means for the first mentioned means, a generally tubular guard fixed on said top wall depending into the tank preventing unauthorized removal of a bottle or the like disaligned with said opening, said guard having diametrically opposite openings through which the bottles may be moved by the conveyor means.

5. A device of the class described having a tank provided with a discharge opening in a wall thereof, means in the tank operable to advance bottles or the like to said opening, operating means for the first mentioned means, a guard depending into the tank to prevent unauthorized removal of a bottle or the like disaligned with said opening, said guard being generally tubular and having an opening in its side wall through which a bottle or the like is moved by said conveyor means to align with said opening, the first mentioned means being a conveyor to hold the bottles or the like, and a device operable by said operating means as the bottles or the like align with the discharge opening to partially eject the adjacent bottle upwardly through said guard and support such bottle in partially ejected position.

6. A machine of the class described having a tank, a horizontal skeleton chassis therein, a conveyor movable over the chassis, rails integral with the chassis supporting the conveyor, bearings on the chassis disposed below the upper edges of the rails, vertical shafts journalled in said bearings, means to drive one of said shafts, and means on the shafts surrounded by the rails and below the upper edges thereof over which the conveyor is trained.

7. A machine according to claim 6 wherein said chassis is in one piece, and slotted securing elements about the margin of said chassis.

8. A machine of the class described having a tank, a horizontal skeleton chassis therein, a conveyor movable over the chassis having carrying members, rails on the chassis supporting said members and along which they are moved, said chassis having depressed portions intermediate the rails, said carrying members having depressed elements movable in said depressions, gear members journaled in the depressed portions in engagement with adjacent depressed elements, and link means in the depressed portions pivoted to adjacent depressed elements.

9. In a device of the class described, a cup having a plurality of compartments for bottles or the like having elements struck inwardly from opposite side walls between the compartments, said elements at their free ends being secured together.

10. In a device of the class described, a conveyor comprising cups to hold bottles or the like, integral, hollow studs depending from the bottom of each cup, driving means engageable with said studs, links below said studs and driving means, and means penetrating the lower ends of the studs pivotally connecting the links to the studs.

LOUIS H. MORIN.